United States Patent
Heil et al.

(10) Patent No.: US 8,686,210 B2
(45) Date of Patent: Apr. 1, 2014

(54) METHOD FOR EXTRACTING GASEOUS HYDROCARBONS FROM BIOGENIC RAW MATERIALS

(75) Inventors: Volker Heil, Oberhausen (DE); Wolfgang Urban, Falkensee (DE); Axel Kraft, Oer-Erkenschwick (DE); Christoph Unger, Wesel (DE); Karl Meller, Witten (DE); Joachim Danzig, Oberhausen (DE); Ulrich Seifert, Essen (DE); Anna Fastabend, Duisburg (DE); Silvana Rossow, Gross Wokern (DE); Andreas Menne, Muelheim a.d. Ruhr (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 292 days.

(21) Appl. No.: 13/121,591

(22) PCT Filed: Sep. 29, 2009

(86) PCT No.: PCT/EP2009/062638
§ 371 (c)(1),
(2), (4) Date: Jun. 20, 2011

(87) PCT Pub. No.: WO2010/037756
PCT Pub. Date: Apr. 8, 2010

(65) Prior Publication Data
US 2011/0237854 A1  Sep. 29, 2011

(30) Foreign Application Priority Data

Sep. 30, 2008 (DE) .......................... 10 2008 049 778

(51) Int. Cl.
*C07C 1/207* (2006.01)
(52) U.S. Cl.
USPC ........... 585/638; 585/240; 585/469; 585/639; 585/733; 44/605
(58) Field of Classification Search
USPC ............. 585/240, 469, 638–639, 733; 44/605
See application file for complete search history.

(56) References Cited

U.S. PATENT DOCUMENTS

| | | | |
|---|---|---|---|
| 1,960,951 A | | 5/1934 | Oppenheim |
| 6,875,317 B1 | | 4/2005 | Toyoda |
| 2007/0043250 A1 | * | 2/2007 | Xu et al. ........................ 585/639 |
| 2008/0034645 A1 | * | 2/2008 | Bressler ........................ 44/308 |

FOREIGN PATENT DOCUMENTS

| | | |
|---|---|---|
| DE | 43 35 399 | 4/1995 |
| DE | 100 47 787 | 3/2002 |
| DE | 103 27 059 | 1/2005 |
| DE | 600 26 264 | 8/2006 |
| DE | 10 2005 023 601 | 11/2006 |
| EP | 1 077 248 | 2/2001 |
| EP | 1 180 542 | 2/2002 |
| EP | 1 489 157 | 12/2004 |
| EP | 1 724 325 | 11/2006 |
| GB | 1447546 | 8/1976 |
| IN | 1281/CHE/2006 | 1/2008 |
| WO | 96/30464 | 10/1996 |
| WO | 2007/137566 | 12/2007 |
| WO | 2007/137856 | 12/2007 |

OTHER PUBLICATIONS

Katikaneni et al., "Performance of Aluminophoshate Molecular Sieve Catalysts for the Production of Hydrocarbons from Wood-Derived and Vegetable Oils", Energy & Fuels, 1995, pp. 1065-1078.
Katikaneni et al., "Performance Studies of Various Cracking Catalysts in the Conversion of Canola Oil to Fuels and Chemicals in a Fluidized-Bed Reactor", The Americal Oil Chemists' Society, 1998, pp. 381-391, vol. 75, No. 3.
Rane et al., "Cracking of n-heptane over Bronsted acid sited and Lewis acid Ga sites in ZSM-5 zeolite", ScienceDirect, Jun. 14, 2007, pp. 279-291.
Demirbas et al., "New Options for Conversion of Vegetable Oils to Alternative Fuels", Energy Sources, 2006, pp. 619-626.
Nordhoff, ""Nachwachsende Rohstoffe in der chemischen Industrie—weg vom Ol?"", Chemieingenieurtechnik 79 (5), ., pp. 551-560.
http://goldbook.iupac.org/M03853.html, IUPAC definition.
German Office Action dated Jul. 14, 2009 for counterpart German Application No. 10 2008 049 778.9 (along with partial English-language translation).

* cited by examiner

*Primary Examiner* — Brian McCaig
(74) *Attorney, Agent, or Firm* — Greenblum & Bernstein, P.L.C.

(57) ABSTRACT

A process for obtaining gaseous hydrocarbons from a starting material which contains oxygen-containing hydrocarbons. The process includes providing the starting material and contacting the starting material with a porous catalyst at a temperature of 300-850° C. in the absence of oxygen in a converting reactor so as to form a hydrocarbon-containing product gas mixture in which a proportion by weight of gaseous hydrocarbons is greater than a proportion by weight of liquid hydrocarbons in the gas mixture. Additionally, the process includes collecting a hydrocarbon-containing product gas stream of the hydrocarbon-containing product gas mixture and introducing the product gas stream into a separation apparatus in which product fractionation is carried out.

25 Claims, No Drawings

METHOD FOR EXTRACTING GASEOUS HYDROCARBONS FROM BIOGENIC RAW MATERIALS

CROSS REFERENCE TO RELATED APPLICATIONS

The present application is a U.S. National Stage of International Application No. PCT/EP2009/062638 filed Sep. 29, 2009, which published as WO 2010/037756 A3 on Apr. 8, 2010, the disclosure of which is expressly incorporated by reference herein in its entirety. Further, this application claims priority under 35 U.S.C. §119 and §365 of German Application No. 10 2008 049 778.9 filed Sep. 30, 2008, whose disclosure content is hereby incorporated by reference.

BACKGROUND OF THE INVENTION

1. Field of the Invention

The invention relates to a process for obtaining gaseous hydrocarbons, in particular gas mixtures similar to liquefied (petroleum) gas and natural gas. Here, as starting materials partially oxygen-containing hydrocarbons are converted over a catalyst into short-chain hydrocarbons. The process therefore provides a route for generating materials of value from secondary materials (which would have to be disposed of in an expensive manner).

2. Background Description

There have been many proposals in the past for converting fats or oils into fuels or other energy carriers into hydrocarbons. Thus, U.S. Pat. No. 1,960,951 describes a process for the catalytic conversion of vegetable oils in order to obtain liquid hydrocarbons, in addition to which volatile products are also formed. Activated carbon is used as catalyst here. The oil to be converted is pressurized by a compressed air compressor; it is subsequently passed in the liquid state through the heated activated carbon bed. This results in a kind of "cracking," at least in the case of vegetable oils such as peanut oil.

DE 103 27 059 A 1 describes a process in which a fat- or oil-containing or fatty acid-containing starting material is brought into contact at a temperature of 150 to 850° C. in the absence of oxygen with an activated carbon fixed bed in a reactor. Here, the fats are dissociated and the fatty acids are decarboxylated and degraded to shorter-chain hydrocarbons.

DE 10 2005 023 601 A1 describes a variant of the process of DE 103 27 059 A1, in which the starting material is brought into contact with the activated carbon in the presence of water or a material which liberates water. Finally, DE 43 35 399 A1 describes a process for converting used oil or biooil into fuels similar to diesel oil, in which the vaporized starting material is brought into contact with catalysts containing perovskites at a temperature in the range from 350 to 500° C.

In all the above processes, essentially liquid hydrocarbons (having at least five carbon atoms) are produced. Shorter-chain hydrocarbons are only obtained as (undesirable) by-product which is at most used for heating the converted reactors.

Furthermore, it is known that biomass can be converted into syngas from which alkanes can be synthesized in the Fischer-Tropsch process. Hydrocarbons having various chain lengths are only subsequently built up again from the syngas ($H_2$+CO). The Fischer-Tropsch process also has the disadvantage that it can be implemented economically feasibly only on a very large scale and is associated with a considerable energy consumption.

It is also known that ethanol can be produced from biogenic raw materials (cf., for example, S. Nordhoff, "Nachwachsende Rohstoffe in der chemischen Industrie—weg vom Öl?" Chemieingenieurtechnik 79 (5), 551 to 560). The pure hydrocarbon butane could be produced therefrom by hydrogenation. However, this makes little commercial sense.

Finally, it is also known that n-heptane can be converted by cracking over zeolite catalysts into hydrocarbon compounds having from 2 to 4 carbon atoms (N. Rane et al., "Cracking of n-heptane over Brönsted acid sites and Lewis acid Ga sites in ZSM-5 zeolites" Microporous and Mesoporous Materials 110, 2008, 279). However, this is a process in which only a single cracking step is required to convert the starting material into fragments having 3 or 4 carbon atoms.

SUMMARY OF THE INVENTION

It is therefore an aim of the present invention to overcome the disadvantages of the prior art and to provide a process by which oxygen-containing hydrocarbons or hydrocarbon mixtures can be converted into gaseous hydrocarbons, in particular into liquefied petroleum gas and/or a gas mixture similar to natural gas.

This aim is achieved by a process for obtaining gaseous hydrocarbons, in particular liquefied petroleum gas and/or a gas mixture similar to natural gas or one or more components present in the liquefied petroleum gas or in the gas mixture similar to natural gas, from a starting material which contains or consists of oxygen-containing hydrocarbons, which comprises the following steps: provision of the starting material; contacting of the starting material with a porous catalyst at a temperature of 300-850° C. in the absence of oxygen in a converting reactor so as to form a hydrocarbon-containing product gas mixture in which the proportion by weight of the gaseous hydrocarbons is greater than that of the liquid hydrocarbons; and collection of the hydrocarbon-containing product gas stream and introduction of the product gas stream into a separation apparatus in which product fractionation is carried out. Dependent claims indicate advantageous embodiments.

DETAILED DESCRIPTION OF THE INVENTION

According to the invention, gaseous hydrocarbons are obtained by bringing a starting material which contains oxygen-containing hydrocarbons or consists thereof into contact with a porous catalyst at a temperature of from 300 to 850° C. in the absence of unbound oxygen in a converted reactor containing said catalyst so as to give a product spectrum in which the proportion by weight of gaseous hydrocarbons is greater than that of the liquid hydrocarbons.

Here, the fats, alcohols, polyols or organic acids present in the starting materials are dissociated and the oxygen is at least partially removed from the compounds. Thereby, in particular, CO and $CO_2$ are formed. Fatty acids are decarboxylated and the long-chain hydrocarbons are converted into shorter-chain hydrocarbons. The product gas stream (which can contain the hydrocarbons together with carbon monoxide, carbon dioxide, hydrogen and an inert gas) is, if necessary, condensed in order to separate off hydrocarbons which are liquid under normal conditions. Inert gases such as carbon dioxide and nitrogen can be fed back into the reactor to make the reactor inert.

According to the invention, a gaseous hydrocarbon is, in particular, a hydrocarbon having a chain length of from 1 to 4 carbon atoms. The gaseous hydrocarbons therefore have a boiling point of less than 30° C. at atmospheric pressure (1013 mbar). The gaseous hydrocarbons preferably have, as indicated in DIN 51622, a vapor pressure of less than or equal to 13 bar at a temperature of 70° C. On the other hand, a liquid hydrocarbon is, in particular, a hydrocarbon having more than four carbon atoms. The boiling point of the liquid hydrocarbons is, in particular, greater than or equal to 28° C. at atmospheric pressure (1013 mbar).

According to the invention, liquefied (petroleum) gas comprises hydrocarbons and mixtures thereof which contain essentially hydrocarbons having three or four carbon atoms. In particular, liquefied (petroleum) gas contains hydrocarbons selected from the group consisting of propane, propene, butane/isobutane, butene/isobutene and mixtures of 2 or more of the substances mentioned, or consists thereof.

Furthermore, a liquefied (petroleum) gas can, in particular, also be a mixture for domestic and commercial use in accordance with DIN 51622. According to this standard, mixtures for domestic and commercial use should contain not more than 60% by mass of hydrocarbons having four carbon atoms. At least 95% by mass thereof is made up of butane and butene isomers, with the content of butane isomers having to predominate. The hydrocarbons having three carbon atoms have to comprise at least 95% of propane and propene and the propane content has to predominate.

According to the invention, a gas mixture similar to natural gas is a gas mixture whose proportion of hydrocarbons having one or two carbon atoms corresponds to the proportion of hydrocarbon in pure natural gas (but at least the proportion of methane in pure natural gas) or exceeds this proportion. The proportion of the components methane, ethane and ethene in a gas mixture similar to natural gas is therefore at least 85% by volume, preferably more than 95% by volume and particularly preferably greater than 99% by volume.

According to the invention, oxygen-containing hydrocarbons or hydrocarbon mixtures are used as starting materials. Particularly significant starting materials are biogenic starting materials. Particular mention may be made of lipids and fat-like compounds as starting materials; for the present purposes, starting materials containing lipids and/or fat-like compounds are starting materials which contain or consist of lipids and/or significant constituents of lipids (for example, polyalcohols or glycerol as well as monoglycerides and diglycerides).

The hydrocarbons present in the starting material normally comprise at least 99% by weight of oxygen-containing hydrocarbons. However, starting materials having a lower proportion of oxygen-containing hydrocarbons can also be used. In addition, water can also be present in the starting material; the proportion of water can be, based on the total weight of the starting material, up to 25% by weight or more. For example, the proportion of water in waste fat is frequently up to 8% by weight of water; a similar situation also applies to glycerol from biodiesel production, in which the water content can also be 20% by weight. In addition, glycerol from biodiesel production can also contain traces of catalyst and biodiesel.

According to the invention, a porous catalyst is a material whose surface has pores which are accessible to the starting material to be converted or the materials present therein and is able to dissociate the starting material or the materials present therein into fragments or is able to catalytically promote the dissociation of the starting material. Catalysts which may be mentioned here are, in particular, finely porous substances (i.e. substances having pores having a pore diameter of less than or equal to 20 µm). Among these, materials which contain mesopores and/or micropores and/or submicropores are preferred according to the invention (according to the IUPAC definition, mesopores have a pore diameter of from 2 to 50 nm, micropores have a pore diameter of from 0.4 to 2 nm and submicropores have a pore diameter of less than 0.4 nm).

The process of the invention offers for the first time the opportunity of achieving high yields of liquefied (petroleum) gas components and of gas mixtures similar to natural gas by dissociation of precursors such as fats and oils, in particular biogenic precursors. The processes of the prior art are essentially designed for dissociating fats and similar materials into relatively long-chain hydrocarbons. Essentially, these processes are therefore directed at cleaving the starting materials at the bonds formed between carbon atoms and heteroatoms. Cleavage of carbon-carbon bonds is, in contrast, of only very minor importance or even undesirable.

On the other hand, the cleavage of carbon-carbon bonds is significantly more important in the process of the invention, so that the catalysts and the process parameters are also designed to ensure multiple cleavage of pure hydrocarbon chains. In contrast to the previously known processes, at least twice as many carbon-carbon bonds as carbon-heteroatom bonds are therefore normally cracked.

Compared to the Fischer-Tropsch process, significantly fewer carbon-carbon bonds have to be broken according to the invention; a significantly less energy-intensive process is therefore made available. Furthermore, an advantage over the Fischer-Tropsch synthesis is that the complicated downstream processing which is unavoidable in the Fischer-Tropsch process due to the formation of very long-chain, wax-like by-products and is responsible for the economic limitations to a very large scale is dispensed with.

The product spectrum achieved by the process of the invention, in which the proportion by weight of the gaseous hydrocarbons is greater than that of the liquid hydrocarbons, can be achieved, in particular, by realization of one or more of the following parameters or process features:

a.) Products having a chain length of more than four carbon atoms are completely or partly added back to the starting material or reintroduced into the converting reactor. Furthermore, these products can be fed to a process or mass transfer step occurring before converting. This way of carrying out the process is very advantageous particularly when the process is configured so that the $C_1$ to $C_4$ components are obtained in gaseous form and the liquid longer-chain components can therefore be separated off without difficulty.

b.) The residence times of the material to be cracked over the catalyst or the feed stream-to-catalyst ratios can be increased. When the process of the invention is carried out batchwise, the feed stream-to-catalyst ratio can be from 0.1 to 1 $g_{feed}*h^{-1}$ per $g_{catalyst}$ and preferably from 0.2 to 0.5 $g_{feed}*h^{-1}$ per $g_{catalyst}$. When the process is carried out continuously, the feed-to-catalyst ratio should be from about 5 to 50 $g_{feed}$ per $g_{catalyst}$. The longer residence times over the catalyst bring about multiple rupture of carbon-carbon bonds in one of the same starting molecule.

c.) The process can be carried out at a higher pressure than according to the prior art. It can thus not only be carried out at pressures in the range from 20 to 2000 mbar but also at pressures in the range from 2000 to 20 000 mbar. As a result of the higher pressure, the molecules to be cracked remain absorbed longer and/or in more frequently on the reactive sites of the catalyst. This is advantageous when carbon-carbon bonds are to be cracked.

d.) The process of the invention can be carried out at temperatures of from 300 to 700° C., preferably from 550 to 650° C., in the converting reactor. The temperature is normally at least 450° C. As in the case of increased pressure, elevated temperatures also lead to carbon-carbon bonds also preferably being broken in the cracking process and the product spectrum is, therefore, shifted to shorter-chain hydrocarbons.

e.) The porous catalysts used can have a pore spectrum and/or a specific surface area which is tailor made for the starting materials to be converted. This normally also ensures that relatively long-chain hydrocarbons are cracked to short-chain ($C_1$ to $C_4$) hydrocarbon fragments.

The starting material used according to the invention preferably contains lipids and/or waste oils/lubricants having a biogenic basis or consists thereof. The lipids are preferably selected from the group consisting of fats, oils, fatty acids, fatty acid esters, tall oils, monoglycerides, diglycerides and polyols. Examples which may be mentioned here are the polyols glycerol and sorbitol and the methyl esters of fatty acids. Among the fats and oils, used fats and used oils are of particular importance. The term fats and oils is used here as a collective term for solid, semisolid or liquid, more or less viscous products of plants or animal bodies which chemically consist essentially of mixed triglycerides of higher fatty acids having an even number of carbon atoms and small proportions of acyl lipids such as sterol esters and unsaponifiables. The unsaponifiable components frequently also include many foreign constituents such as mineral oils, plasticizers and biocides which accumulate in fat because of its lipophilic character.

As porous catalysts, it is, according to the invention, possible to use, in particular, catalysts which are selected from the group consisting of activated carbons, carbon molecular sieves, activated cokes, carbon nanotubes, zeolites and mixtures thereof or mixtures of these materials (or mixtures) with perovskites and/or zinc chloride.

Examples of suitable perovskite catalysts, in which the perovskites are usually present on a support material, are the perovskite catalysts mentioned in DE 43 35 399 A1. Zinc chlorides are described, for example, in A. Demirbas et al. (2006) "New Options for Conversion of Vegetable Oils to Alternative Fuels." Energy Sources, Part A FIELD Full Journal Title Energy Sources, Part A: Recovery, Utilization, and Environmental Effects 28(7): 619-626. All the above catalysts have a high surface area. Acid sites which can also bring about cleavage of bonds are sometimes present in the catalysts.

The porous catalyst particularly preferably has mesopores and/or micropores. It has been observed that, in particular, a proportion of at least 20% (in % of the total pores present) of pores having a pore diameter greater than or equal to 20 nm can lead to increased formation of gaseous hydrocarbons.

It has been recognized according to the invention that in the case of catalysts which have a pore spectrum in which pore sizes in the range from 0.4 nm to 10 nm in diameter are present in any size distribution, it is ensured that any molecule of the starting material or molecular fragment to be cracked can be absorbed in a number of pores corresponding approximately to the molecular size, and formation of hydrocarbons having from one to four carbon atoms proceeds preferentially. To achieve this, it is also possible to use, for example, a mixture of various catalysts, for example a mixture of various zeolites. For example, zeolites normally have average main pore radii in the range from 3.3 to 15 nm.

A particularly fine adjustment of the pore sizes and the pore distribution and also the catalyst surface area is possible in the case of activated carbons, and these are therefore particularly well suited to the process of the invention. In the case of starting materials which contain relatively short-chain hydrocarbon fragments, activated carbons having small pore radii are available; for larger starting molecules, e.g. triglycerides having long-chain fatty acid substituents, activated carbons having larger pores are available. The pore sizes can be influenced, for example, by the activation of the activated carbon. Thus, physical activation methods (for example steam activation) make it possible to obtain relatively small pores; these are obtained by widening of submicropores and very small micropores. Chemical activation produces larger pores (in particular a larger proportion of mesopores). A part of the carbon is selectively degraded by the chemical and physical activation, resulting in the pore structure.

In the case of gas activation (physical activation), the starting material is, optionally after a carbonization process, generally activated at 800-1000° C. in a steam and/or carbon dioxide atmosphere. Here, part of the carbon is gasified and pores are formed, resulting in a large internal surface area. Starting material and temperature and duration determine the later pore size and distribution. The production process is therefore particularly important for the properties of the carbon.

In the case of chemical activation, phosphoric acid, zinc chloride or other dehydrating materials, for example, are used. As regards the materials for chemical activation, reference may be made to H. von Kienle, E. Bader, "Aktivkohle and ihre industrielle Anwendung", Ferdinand Enke Verlag, Stuttgart, 1980, which is hereby fully incorporated by reference.

Granular activated carbons (also referred to as direct activates) have medium pore sizes between those of chemically and physically activated activated carbons. In contrast to formed activated carbon, in which a carbon supply is firstly mixed in powder form with a binder, followed by shaping, optionally drying, carbonization and activation, these granular activated carbons are obtained directly from the carbon carrier by comminution and activation and an optionally intermediate carbonization step. The pore structure can also be influenced by the parameters prevailing in the production of the activated carbon. Particular mention may be made here of temperature, residence time and amount of steam during drying, carbonization and activation.

The cracking behavior of the porous catalyst and also (in the case of activated carbon as catalyst) the pore size of the catalyst can also be influenced by a material added to the catalyst (for the purposes of the present patent application, referred to as second catalyst), with the porous catalyst being able to be doped and/or impregnated with the second catalyst.

For the present purposes, doping should be understood as the second catalyst being added to the porous catalyst during production of the latter, so that a homogeneous distribution of the second catalyst is present in the finished porous catalyst.

In contrast, impregnation is a treatment of the finished porous catalyst with a material containing or consisting of the second catalyst, so that the second catalyst is present only on the surface (including the pore surface) of the porous catalyst.

Chemically active substances which can alter the chemical reactions over the catalyst can thus be introduced in a targeted manner into the pore system or the matrix of the catalyst by doping and/or impregnation. As dopants or impregnants, it is possible, in particular, to introduce substances which themselves have a catalytic action; as an alternative, it is also possible to introduce substances which alter the properties of the porous catalyst (for example the pH). Depending on the process employed, the physical and adsorptive properties of the porous catalyst are likewise altered here.

In the case of impregnation, which is, as indicated, carried out subsequently, it should be noted that the application of the impregnation reagent alters the pore spectrum and decreases the pore volume. In particular, very small pores are blocked, so that in impregnated substances the proportion of the large micropores and of the mesopores is increased compared to small micropores. If an impregnated catalyst is to be used for the process of the invention, it is frequently necessary to mix in a catalyst which has not been impregnated so that small micropores (having a diameter of less than 1 nm) are also present in a sufficient amount to allow cracking to form the short-chain hydrocarbons having from 1 to 4 carbon atoms.

Doping with metal oxides or materials which form metal oxides during the production of the porous catalyst (for example, potassium carbonate) results in formation of active sites in which agglomerates of the metal oxide or clusters of the metal oxide at which cracking reactions can then occur are formed in the finished porous catalyst (for example, the finished formed activated carbon).

It is observed that when acids are added to the porous catalyst, a shift of the product spectrum toward liquid products (i.e., hydrocarbons having more than four carbon atoms) generally occurs. Preference is therefore given, according to the invention, to doping or impregnating the porous catalyst (for example, the activated carbon) with alkaline components or using undoped/unimpregnated catalysts or catalysts which have not been acid-doped/-impregnated in addition to acid-impregnated/-doped catalysts. In this case, particularly when using alkaline-doped and/or -impregnated porous catalysts, the product spectrum tends to be shifted in the direction of gaseous hydrocarbons. Due to the above-described problem with impregnation of the catalysts, the use of doped catalysts is preferred.

Second catalysts which serve to remove pollutants or foreign materials from the starting material or convert these into gases which can be separated off can also be added to the porous catalyst used according to the invention. For example, it is conceivable to convert sulfur in the starting material by suitable catalysts (for example, based on manganese oxide).

As regards the process for producing doped catalysts and the possible dopants (i.e. the second catalyst), reference may be made to WO 2007/137856 A2, which is hereby fully incorporated by reference.

In an advantageous embodiment, the process of the invention can be carried out with the starting materials being fed in liquid form into the converting reactor. This has the advantage that it is not necessary to expend energy to bring the unconverted starting material into the gas phase (or vapor phase); however, pressures above 2000 mbar are necessary in this variant.

On the other hand, if the starting material is brought into the vapor or gas phase in the converting reactor, it has to be taken into account that cracking processes can take place in the apparatus in which the starting material is brought into the vapor or gas phase (in particular a combined reaction and phase transition apparatus, in which vaporization of the starting material and/or decomposition of the starting material into vaporizable products and vaporization of these takes place—referred to as vaporizer for the purposes of the present patent application)—so that the starting material comes into contact with the porous catalyst already substantially in a chemically altered form (e.g., in the form of fragments). It is in this case also possible to use catalysts (in particular, activated carbons) having a reduced proportion of very large pores (in particular, mesopores).

Such cracking processes take place particularly when the starting material cannot be vaporized undecomposed, which is the case for, for example, triglycerides; however, cracking processes generally also occur in the case of compounds which can be vaporized without decomposition. To force fission of the starting material or further fission of previously cracked starting material in the vaporizer, the average wall temperature in the vaporizer can be selected so that it is above the vaporization or decomposition temperature of the starting material (and in particular is at least 50° C. above this temperature). The average wall temperature can be, for example, from 340 to 500° C. In the case of a starting material which consists of a mixture of various materials, the decomposition temperature of the starting material is, for the purposes of the invention, defined as the temperature at which decomposition of at least 80% by weight of the total vaporizable materials in the starting material occurs (here, compounds are considered to be not vaporizable if they are still liquid or solid and also do not decompose at a temperature of 600° C., i.e., compounds which cannot be brought into the vapor or gas phase either as such or in the form of decomposition products). In one embodiment, the temperature in the vaporizer can correspond essentially to the temperature in the converting reactor or be only slightly (i.e., up to 50° C.) below this temperature; in some cases, it can also be above this temperature.

In one embodiment, the vaporizer used has elements for increasing the cracking rate on at least part of its interior surface (i.e., the surface which is in contact with the materials which have been vaporized or are to be vaporized). Such elements for increasing the cracking rate can, according to a first variant, be chemically adapted surfaces or surface regions (which can, for instance, be present in the form of a coating) which can, in particular, have acidic sites (particular mention may be made of surfaces or surface regions composed of acidic metal oxides, for example, of aluminum oxide, silicon oxide or silicates). In a second variant, these elements for increasing the cracking rate can be configured geometrically in such a way that they contain regions having a temperature significantly above the average wall temperature; mention may be made by way of example of pyramidal structures, cone-shaped structures or similarly shaped structures whose point directed toward the interior of the vaporizer has a temperature which is significantly above the average wall temperature because of a high thermal conductivity of the material (in particular a metal, e.g., aluminum) of which they are made.

In a further advantageous embodiment, the starting material can be contacted with the porous catalyst in the presence of water and/or a water-releasing material in the process of the invention. The addition of water or water-releasing materials makes it possible to increase the catalyst life time. The addition of water is therefore particularly useful in processes to be carried out continuously. Water should preferably be present in such an amount that, based on the starting materials to be converted, at least one molar equivalent of water (in free form or in the form of water-releasing materials) is present. Quite generally, a water-releasing material is a material or mixture which either contains bound water which can be liberated or a material or mixture which forms water by a chemical reaction, for example a condensation reaction (for example, glycerol).

Particular preference is given to a maximum of ten percent by volume of water, as average over time and position, and/or, based on the starting materials to be converted, at least two molar equivalents of water being present in the reaction space.

The addition of water can, in particular, be effected by introducing a stream of water or steam into the converting reactor. Instead of water, it is also possible to use water-containing materials or materials which liberate water under the reaction conditions prevailing in the converting reactor. The water, water-containing mixture or water-releasing material can also be added to the starting materials. In addition, water is frequently already present in the starting materials. Finally, the water or water-releasing material can also be added to the inert gas stream.

As converting reactor, it is possible to use any furnace which can be heated in an appropriate way. Converting can be carried out continuously or discontinuously. For the present purposes, continuous operation should be understood as the starting materials being introduced continuously. In particular, the starting materials can be introduced in gas form or vapor form. Possible converting reactors are thus fixed-bed reactors of any construction type, moving beds, stationary and circulating fluidized-bed reactors (including jet mixers), simulated fluidized bed, rotary grate generators, shaft furnaces, multitier furnaces or rotary tube furnaces.

The porous catalyst can be arranged in the converting reactor in any way so that the materials to be converted can pass through or over the catalyst. Contacting of the liquid or gaseous starting materials with the porous catalyst can be effected in any suitable way, for example, by spraying-on of liquid, cold or heated starting material or by a gas stream comprising starting substances in gas or vapor form being passed through the bed. In some cases, a solid starting material will also be able to be introduced directly onto the heated catalyst or directly into the converting reactor. The catalyst can likewise be introduced continuously or discontinuously.

To make the reaction space inert, this should be flushed beforehand with a carrier gas. Possible carrier gases are, in particular, an inert gas (such as nitrogen or carbon dioxide), water or steam or a $CO/CO_2$ mixture. When the starting materials to be converted are introduced in gaseous form into the converting reactor, it is possible to take them up in a gas stream of carrier gas and transfer them into the reactor together with the carrier gas. As an alternative, the carrier gas can also be introduced separately into the reactor. Making the converting reactor space inert is necessary since otherwise undesirable reactions of the catalyst occur at high temperatures (for example, activated carbon used as catalyst can burn). For the purposes of the present invention, a carrier gas is a gas which serves to displace oxygen or other materials which lead to undesirable reactions over the catalysts. The use of $CO_2$ or $CO/CO_2$ mixtures as carrier gas has the advantage that a separation step can be saved in the work-up of the product since CO, and CO are in any case formed as dissociation products in the converting reaction, while nitrogen as carrier gas has to be separated off from the product spectrum obtained.

The product gas stream obtained by contacting of the starting material with the catalyst is finally fed to a separation apparatus, e.g., a quench. Here, the relatively short-chain $C_1$-$C_4$-hydrocarbons can be separated off from the longer-chain products. Separation of the liquefied (petroleum) gas fraction from the fraction similar to natural gas can be carried out by distillation or by membrane separation processes or by superatmospheric pressure. Furthermore, the hydrocarbons present in the liquefied (petroleum) gas fraction and the fraction similar to natural gas can also be isolated in pure form. Here too, distillation processes or membrane separation processes are possible.

In a preferred embodiment, the proportion by weight of the gaseous hydrocarbons in the product gas stream is increased by a factor of 1.5, preferably a factor of 2, particularly preferably a factor of 3, over that in the liquid hydrocarbons. The proportion by weight of unreacted starting material present in the product gas stream is preferably not more than 35 percent, particularly preferably not more than 15 percent and very particularly preferably not more than two percent, based on the gaseous hydrocarbons present in the product gas stream.

If the olefin content of the product gas stream is too high, a gas treatment can also be carried out before the separation step. Here, for example, it is possible to use a catalytic hydrogenation section in which the unsaturated hydrocarbons are hydrogenated in the presence of hydrogen which has been added from the outside or been formed in the reaction or hydrogen which has been formed in the shift reaction from CO and water vapor (optionally in the presence of the necessary hydrogenation catalysts). The hydrogenation section can be located downstream of the converting reactor, but can also be arranged in the converting reactor downstream of the region in which converting occurs. As an alternative, it is also possible to impregnate or dope the catalyst used for the converting reaction with a suitable hydrogenation catalyst. Customary hydrogenation catalysts are palladium or platinum; these can be applied in a known manner in the form of solutions to the porous catalyst or be added in the production of the porous catalyst.

Products of the 3rd gas family and also products of the 2nd gas family in accordance with "DVGW Regelwerk, Arbeitsblatt G260, Gasbeschaffenheit 01/2000" and DIN 51622 should preferably predominate in the product gas stream.

An important use of the liquefied (petroleum) gas produced according to the invention is therefore conditioning of natural gas substitutes. The burning properties of these natural gas substitutes can be modified by liquefied (petroleum) gases to produce the natural gas grades required locally for the supply. The liquefied (petroleum) gas produced by the process of the invention (optionally together with C1 and C2 constituents and carrier gas still present) can therefore be added to biogas whose methane content is too high in order for the gas to be able to be used as natural gas. Thus, a natural gas in which all components are biogenic can be produced from biogas (which can, for example, originate from fermentation processes) and the liquefied (petroleum) gas obtained according to the invention.

Furthermore, the liquefied (petroleum) gas produced according to the invention can serve to produce substitute natural gas (a liquefied (petroleum) gas/air mixture which is also referred to as peak saving gas) to cover consumption peaks in the public gas supply network.

The C1 and C2 fractions of the product mixture can likewise be used as substitute natural gas. This includes, for example, thermal use or use for powering engines or use as vehicular fuel (CNG) both at the site of production and also after introduction of the gas mixture similar to natural gas into the natural gas supply network.

Without restricting the generality, the invention is illustrated below with the aid of examples:

Here, the following measured properties are used:
tapped density [g/l] in accordance with DIN ISO 787, part 11;
iodine number [$mg_{iodine}/g_{activated\ carbon}$] (in accordance with AWWA B600-78 Powered Activated Carbon);
specific surface area determined by the BET method in accordance with DIN 66 131
benzene loading [% by weight]; and
pore sizes and adsorption pore volume.

To determine the tapped density, a carbon bed is compacted under defined tapping conditions (1250 strokes, drop height 3.0 mm) by a stamping volumeter in a 250 ml measuring cylinder. The examined formed activated carbons are activated carbon pellets having a diameter of from 2 to 4 mm. It is in principle possible to use activated carbon pellets or shaped bodies having a customary diameter of 1-6 mm.

The benzene loading is determined by calculation from the cyclohexane loading. Here, air saturated with cyclohexane vapor is mixed with pure air in various ratios; loading streams having different partial pressures are produced thereby. The loading of the activated carbon is carried out in U-tubes which are located in a thermostatic water bath. The activated carbon is loaded with air which is, for example, saturated to an extent of 9/10, 1/10 and 1/100 with cyclohexane or at the indicated concentration to equilibrium or to constant weight at 20° C. Loading is carried out in a first step using the highest concentration at a partial pressure ratio of 0.9. Desorption is subsequently carried out to constant weight at a partial pressure ratio of 0.1. A further desorption step is carried out at a partial pressure ratio of 0.01.

The iodine number describes the amount of iodine [mg] which is adsorbed by 1 g of activated carbon in the pulverized state from 100 ml of a 0.1 N iodine solution (0.05 M until a residual normality or final concentration of 0.02 N is reached.

The adsorption pore volume is calculated from the total nitrogen loading. The distribution of the pore sizes is calculated from the desorption isotherms by the BJH (Barrett, Joyner and Halenda) equation. For this method, reference may be made to J. U. Keller, R. Staudt, Gas Adsorption Equilibria, Experimental Methods and Adsorptive Isotherms, Springer, 2005.

EXAMPLE 1

As starting material, it is possible to use, for example, a mixture of vegetable and animal fat. This is subjected to a first fat preheating which serves to liquefy the fat at 70° C. and reduce its viscosity so that it can be pumped in a defined amount by a pump into a second preheating where it is heated further to 180° C. From the second preheating, the fat goes via an overflow which ensures maintenance of a constant volume flow into a vaporizer. This can, for example, be configured as a bottom vaporizer. In the vaporizer, the fat is vaporized at 450° C. and combined with steam (which has been preheated to the temperature prevailing in the converting reactor) and nitrogen. The mixture of fat vapor, water vapor and nitrogen is then fed to a fixed-bed reactor filled with activated carbon. The fats are converted into a mixture of hydrocarbons over the activated carbon, this mixture is condensed in order to analyze the product mixture, separated by a gas chromatograph and analyzed by a mass spectrometer. "Liquid product" (i.e., hydrocarbons having more than five carbon atoms) formed in the process is separated off from the liquefied (petroleum) gas fraction and the fraction similar to natural gas and can, for example, be burnt, and thus, provide energy for the converting process. Furthermore, $CO_2$ is separated off; this can be recirculated to the process and replace the nitrogen stream in the inert gas.

EXAMPLE 2

Converting of Used Fat Over Activated Carbon at 500° C.

Used fat (collected from gastronomy) is fed as described in example 1 to a reactor charged with activated carbon. The converting reaction is operated in a discontinuously operated converting reactor into which 1 g per minute of starting material is introduced, at 500° C. and 1013 mbar, a residence time of 3 seconds and a feed stream-to-catalyst ratio of 0.45 $g_{feed} * h^{-1}$ per $g_{catalyst}$.

The activated carbon type 1 is used as activated carbon. This is a steam-activated granular activated carbon based on coconut shells and having the following properties:

specific surface area 1109 m$^2$/g;

adsorption pore volume 0.436 cm$^3$/g;

volume-based surface area 525.67 m$^2$/cm$^3$;

iodine number 1197 mg/g;

water content 2.65% by weight;

tapped density 480 kg/m$^3$;

poured density 474 kg/m$^3$;

particle size 2.4-4.8 mm;

benzene loading at 20° C. (the benzene concentration in g/m$^3$ and the associated loading in % at a measurement tolerance of +/−2% is reported in each case): 288 g/m$^3$-35%; 32 g/m$^3$-32%; 3.2 g/m$^3$-28%; 1.6 g/m$^3$-26%; 0.3 g/m$^3$-22%;

pore radius distribution (the pore diameter in nm and the associated proportion in % of the total pores is reported in each case): <6 nm-56.1%; 6-8 nm-4.9%; 8-10 nm-3.6%; 10-12 nm-3.6%; 12-16 nm-4.1%; 16-20 nm-3.6%; 20-80 nm; and 19.6%; >80 nm-4.8%.

When the process is carried out in this way, the product spectrum shown in table 1 is formed. Here, the term "gas product" refers to any component whose boiling point at atmospheric pressure is less than or equal to that of n-pentane. The term "liquid product" refers to products having a higher boiling point. The increase in mass of the activated carbon is also added to the product spectrum since this likewise has to have been formed by converting of the starting materials. The liquid product formed in example 2 is composed mainly of aromatic and polyaromatic compounds.

TABLE 1

Proportion of the various fractions in the total product in percent by weight.

| Product | Proportion [% by weight] |
| --- | --- |
| Gas product | 63.82 |
| Liquid product | 21.71 |
| Increase in mass of activated carbon | 11.56 |
| Water | 2.37 |
| Unreacted product | 0.54 |

Table 2 shows the composition of the gas product. Apart from CO and $CO_2$ formed by decarboxylation and decarbonylation of the fatty acids, hydrogen and various hydrocarbons are also formed. The liquid gas fraction has a proportion of about 22% by weight and is therefore the largest fraction. In addition, about 10% by weight of methane and 20% by weight of C2 compounds are formed.

TABLE 2

Composition of the "gaseous product"

| Substance | Proportion in the product gas [% by weight] |
| --- | --- |
| Methane | 10.83 |
| Ethane | 17.12 |
| Ethene | 3.2 |
| Propane | 15.44 |
| Isobutane | 6.54 |
| n-Pentane | 5.1 |
| CO | 21.62 |
| CO2 | 9.67 |
| Further substances (N2 + hydrocarbons) | 10.48 |

EXAMPLE 3

Converting of Used Fat in the Presence of Doped Activated Carbon

Converting is carried out as described in example 2, but alkaline-doped activated carbon or acid-impregnated activated carbon is used as activated carbon of type 2 (doped/impregnated activated carbon) and the temperature in the catalyst bed is 450-460° C. Furthermore, example 3 was carried out without addition of water.

The alkaline-doped activated carbon was obtained by addition of potassium carbonate and a transition metal oxide to the remaining starting materials for the activated carbon as per the process according to WO 2007/137856 A2 during the production process. It has the following properties: iodine number 1168 mg/g; benzene loading: 0.9-36.45% by weight; 0.1-32.32% by weight; 0.01-17.02% by weight.

The acid-impregnated activated carbon was obtained by impregnating a conventional steam-activated activated carbon by a phosphoric acid solution (the impregnation was carried out by steeping and subsequent drying of the activated carbon). Here, activated apricot stones were used (steam-activated, as direct activator: no binder, no shaping) and were impregnated with $H_3PO_4$ (7.7% by weight impregnation-iodine number before impregnation 1130 mg/g; iodine number after impregnation 785 mg/g).

Table 3 shows the proportion of the products obtained.

TABLE 3

Proportion of the various fractions in the total product in percent by weight

| Product | Alkaline-doped activated carbon Proportion [% by weight] | Acid-impregnated activated carbon Proportion [% by weight] |
|---|---|---|
| Gas product | 52.19 | 17 |
| Liquid product | 24.63 | 63.9 |
| Increase in mass of activated carbon | 6.72 | 19.1 |
| Unreacted product | 16.46 | 0 |

The invention claimed is:

1. A process for obtaining gaseous hydrocarbons from a starting material which contains oxygen-containing hydrocarbons, the process comprising:
   providing the starting material;
   contacting the starting material with a porous catalyst at a temperature of 300-850° C. and at a pressure of 20-2000 mbar in the absence of oxygen in a converting reactor so as to form a hydrocarbon-containing product mixture by cleavage of carbon-carbon bonds in which a proportion by weight of gaseous hydrocarbons is greater than a proportion by weight of liquid hydrocarbons in the mixture;
   collecting a hydrocarbon-containing product gas stream of the hydrocarbon-containing product mixture, in which a weight percent of alkanes is greater than a weight percent of olefins; and
   introducing the product gas stream into a separation apparatus in which product fractionation is carried out.

2. The process of claim 1, wherein the gaseous hydrocarbons comprise at least one of liquefied petroleum gas and a gas mixture similar to natural gas, or one or more components present in the liquefied petroleum gas or in the gas mixture similar to natural gas.

3. The process of claim 2, wherein the liquefied petroleum gas is a hydrocarbon mixture whose hydrocarbons are selected from the group consisting of propane, propene, butane, butene, isobutane and isobutene, and mixtures thereof.

4. The process of claim 2, wherein the gas mixture similar to natural gas comprises at least one of methane, ethane and ethane ethene.

5. The process of claim 1, wherein a feed stream-to-catalyst ratio is from 0.1 to 1 $g_{feed}*h^{-1}$ per $g_{catalyst}$ and the process is carried out discontinuously.

6. The process of claim 5, wherein the feed stream-to-catalyst ratio is from 0.2 to 0.5 $g_{feed}*h^{-1}$ per $g_{catalyst}$.

7. The process of claim 1, wherein the starting material is selected from the group consisting of fats, oils, fatty acids, fatty acid esters, tall oils, monoglycerides, diglycerides and polyols, and mixtures thereof.

8. The process of claim 1, wherein the porous catalyst is selected from the group consisting of activated carbons, hydrocarbon molecular sieves, activated cokes, carbon nanotubes, mixtures thereof, and mixtures of activated carbons, hydrocarbon molecular sieves, activated cokes, and carbon nanotubes, with at least one of perovskites and zinc chloride.

9. The process of claim 8, further comprising at least one of doping and impregnating the porous catalyst with a second catalyst.

10. The process of claim 8, further comprising at least one of doping and impregnating the porous catalyst with an alkaline component.

11. The process of claim 1, wherein the porous catalyst contains at least one of mesopores and micropores.

12. The process of claim 1, further comprising feeding the starting material to a vaporization apparatus before the contacting with the porous catalyst.

13. The process of claim 1, wherein reactions in which at least part of the starting material is decomposed occur in a vaporization apparatus.

14. The process of claim 1, wherein the contacting of the starting material with the porous catalyst is carried out in the presence of at least one of water and a water-releasing material.

15. The process of claim 14, wherein the at least one of the water and the water-releasing material is at least one of added to an inert gas of the gas stream, added to the starting material, introduced in gaseous form into the converting reactor, and is present in the starting material.

16. The process of claim 1, wherein the proportion by weight of the gaseous hydrocarbons in the product gas stream is a factor of at least 1.5 higher than the proportion of liquid hydrocarbons.

17. The process of claim 16, wherein the proportion by weight of the gaseous hydrocarbons in the product gas stream is a factor of at least 2 higher than the proportion of liquid hydrocarbons.

18. The process of claim 17, wherein the proportion by weight of the gaseous hydrocarbons in the product gas stream is a factor of at least 3 higher than the proportion of liquid hydrocarbons.

19. The process of claim 1, wherein a proportion by weight of unreacted starting material in the product gas stream is not more than 35% of the proportion of gaseous hydrocarbons.

20. The process of claim 19, wherein the proportion by weight of unreacted starting material in the product gas stream is not more than 15% of the proportion of gaseous hydrocarbons.

21. The process of claim 20, wherein the proportion by weight of unreacted starting material in the product gas stream is not more than 2% of the proportion of gaseous hydrocarbons.

22. The process of claim 21, further comprising feeding, at least in part, at least one of the unreacted starting material and hydrocarbons, which are liquid under normal conditions and which are present in the product gas stream, at least one of during a process step and a mass transfer before the converting reaction in the converting reactor.

23. The process of claim 21, further comprising introducing, at least in part, at least one of the unreacted starting material and hydrocarbons, which are liquid under normal conditions and which are present in the product gas stream, into at least one of the starting material and the converting reactor prior to the conversion reaction therein.

24. The process of claim 23, wherein the introducing, at least in part, comprises introducing at least one of the unreacted starting material and hydrocarbons in their entirety.

25. A process for obtaining gaseous hydrocarbons from a starting material which contains oxygen-containing hydrocarbons, the process comprising:
   providing the starting material which comprises components being selected from the group consisting of fats, oils, fatty acids, fatty acid esters, tall oils, monoglycerides, diglycerides, and polyols, and mixtures thereof;
   contacting the starting material with a porous catalyst at a temperature of 300-850° C. and at a pressure of 20-2000 mbar in the absence of oxygen in a converting reactor so as to form a hydrocarbon-containing product mixture by cleavage of carbon-carbon bonds in which a proportion by weight of gaseous hydrocarbons is greater than a proportion by weight of liquid hydrocarbons in the mixture;
   collecting a hydrocarbon-containing product gas stream of the hydrocarbon-containing product mixture; and
   introducing the product gas stream into a separation apparatus in which product fractionation is carried out.

\* \* \* \* \*